United States Patent
Koganezawa et al.

(10) Patent No.: US 7,719,632 B2
(45) Date of Patent: May 18, 2010

(54) LIQUID CRYSTAL DISPLAY DEVICE

(75) Inventors: Nobuyuki Koganezawa, Chiba (JP); Akiyoshi Tobe, Mobara (JP); Yasuhisa Shiraishi, Mobara (JP)

(73) Assignees: Hitachi Displays, Ltd., Mobara-shi (JP); Hitachi Display Devices, Ltd., Mobara-shi (JP)

( * ) Notice: Subject to any disclaimer, the term of this patent is extended or adjusted under 35 U.S.C. 154(b) by 120 days.

(21) Appl. No.: 12/166,415

(22) Filed: Jul. 2, 2008

(65) Prior Publication Data

US 2009/0009688 A1    Jan. 8, 2009

(30) Foreign Application Priority Data

Jul. 6, 2007    (JP)    ............................. 2007-177895

(51) Int. Cl.
  G02F 1/1335    (2006.01)
  F21V 7/04    (2006.01)
(52) U.S. Cl. .................... 349/65; 362/337; 362/620; 362/606; 362/607
(58) Field of Classification Search .................. 349/57, 349/61, 62, 65; 362/330, 337, 606–609, 362/620, 626; 385/146
See application file for complete search history.

(56) References Cited

U.S. PATENT DOCUMENTS 5,890,791 A * 4/1999 Saito ........................ 362/620
7,121,709 B2 * 10/2006 Shinohara et al. ........... 362/606
2008/0259634 A1 * 10/2008 Mi et al. ..................... 362/606

FOREIGN PATENT DOCUMENTS

JP    2005-062741    3/2005
JP    2005-275142    10/2005

* cited by examiner

Primary Examiner—Hemang Sanghavi
(74) Attorney, Agent, or Firm—Antonelli, Terry, Stout & Kraus, LLP.

(57)    ABSTRACT

The present invention provides a liquid crystal display device which can largely enhance a property of focusing light from a backlight. The backlight arranged on a back surface of a liquid crystal panel includes a light guide plate, a light source, a first asymmetrical prism sheet, and a second asymmetrical prism sheet. A reflection surface having an inclination of 2° or less for guiding light from the light source toward the liquid crystal display panel is formed on a back surface of the light guide plate. The first asymmetrical prism sheet and the second asymmetrical prism sheet respectively include projecting portions which extend in the arrangement direction of the light source and are arranged in parallel to each other in the direction which intersects the arrangement direction of the light source.

6 Claims, 5 Drawing Sheets

LIQUID CRYSTAL DISPLAY DEVICE

CROSS-REFERENCE TO RELATED APPLICATION

The present application claims priority from Japanese application JP2007-177895 filed on Jul. 6, 2007, the content of which is hereby incorporated by reference into this application.

BACKGROUND OF THE INVENTION

1. Field of the Invention

The present invention relates to a liquid crystal display device, and more particularly to a liquid crystal display device provided with a backlight which mounts a light guide plate on a back surface of a liquid crystal display panel.

2. Description of the Related Art

A liquid crystal display panel is configured to control transmissivity of liquid crystal in respective pixels and hence, the liquid crystal display panel usually mounts a backlight on a back surface thereof.

As such a backlight, there has been known a backlight which includes a light guide plate arranged substantially parallel to the liquid crystal display panel, and a light source such as a light emitting diode, for example, which is arranged to face at least one side wall surface of the light guide plate in an opposed manner.

In the liquid crystal display device having such a constitution, there has been a demand for the enhancement of brightness of image display of a liquid crystal display panel by directing light radiated from the liquid crystal display panel toward a viewer side.

When such a liquid crystal display device is used as a display device of a mobile phone, for example, the enhancement of property of focusing light from the liquid crystal display panel is preferable also from a viewpoint of protecting privacy of a display on the display device.

Accordingly, there has been known the constitution which arranges micro lenses between a backlight and a liquid crystal display panel, wherein the lenses are formed corresponding to respective pixels of the liquid crystal display panel. Due to such a constitution, light from the backlight is focused by the micro lenses and the focused light is incident on the liquid crystal display panel.

The liquid crystal display device having such a constitution is disclosed in JP-A-2005-275142 (patent document 1), JP-A-2005-62741 (patent document 2) or the like, for example.

Further, to enhance the visibility of a liquid crystal display device outdoors, there has been also proposed the conversion from transmissive liquid crystal which has been conventionally used in general in a liquid crystal display device to transflective liquid crystal. However, to compensate for lowering of brightness in a transmissive display mode using transflective liquid crystal, the enhancement of brightness is inevitable.

Further, cases that a television image is received by a personal digital assistant such as a mobile phone are increased in number and hence, the reduction of power consumption is inevitable for allowing a viewer to watch the television image for a long time.

However, in a liquid crystal display device having such a constitution, there has been a further demand for the enhancement of brightness of image display of the liquid crystal display panel by directing light from the backlight toward a viewer side. This is because an image display of high brightness can be realized in spite of low power consumption.

SUMMARY OF THE INVENTION

Accordingly, it is an object of the present invention to provide a liquid crystal display device which can largely enhances property of focusing light from a backlight.

To briefly explain the summary of typical inventions among the inventions disclosed in this specification, they are as follows.

(1) The present invention is directed to a liquid crystal display device including a liquid crystal display panel, and a backlight which is arranged on a back surface of the liquid crystal display panel, wherein the backlight includes a light guide plate, a light source arranged on a side wall surface of the light guide plate, and a first asymmetrical prism sheet and a second asymmetrical prism sheet arranged between the light guide plate and the liquid crystal display panel, a reflection surface having inclination of 2° or less for guiding light emitted from the light source to a liquid-crystal-display-panel side is formed on a back surface of the light guide plate, and the first asymmetrical prism sheet and the second asymmetrical prism sheet are respectively formed such that each prism sheet includes projecting portions which extend along the direction of a side of the light guide plate on which the light source is arranged, and are arranged parallel to each other in the direction which intersects the direction.

(2) A liquid crystal display device according to the present invention is, in the premise of the constitution (1), for example, characterized in that a lenticular lens or a micro lens is arranged between the backlight and the liquid crystal display panel.

(3) A liquid crystal display device according to the present invention is, in the premise of the constitution (1), for example, characterized in that the first asymmetrical prism sheet and the second asymmetrical prism sheet differ from each other in shape.

(4) A liquid crystal display device according to the present invention is, in the premise of the constitution (1), for example, characterized in that the reflection surface formed on a surface of the light guide plate on a side opposite to the liquid crystal display panel has inclination of 1°.

(5) A liquid crystal display device according to the present invention is, in the premise of the constitution (1), for example, characterized in that on the side wall surface on a side of the light guide plate on which the light source is arranged, projecting surfaces which are formed along a thickness direction of the light guide plate are arranged parallel to each other along the side of the light guide plate.

(6) A liquid crystal display device according to the present invention is, in the premise of the constitution (1), for example, characterized in that on a surface of the light guide plate which opposes the liquid crystal display panel, projecting portions which extend while intersecting an extending direction of the reflection surface are formed parallel to each other in the extending direction of the reflection surface.

Here, the present invention is not limited to the above-mentioned constitution, and various modifications are conceivable without departing from the technical concept of the present invention.

The liquid crystal display device having such a constitution can largely enhance property of focusing light from a backlight.

DESCRIPTION OF THE PREFERRED EMBODIMENT

Hereinafter, an embodiment of a liquid crystal display device according to the present invention is explained in conjunction with drawings.

Figure 1:
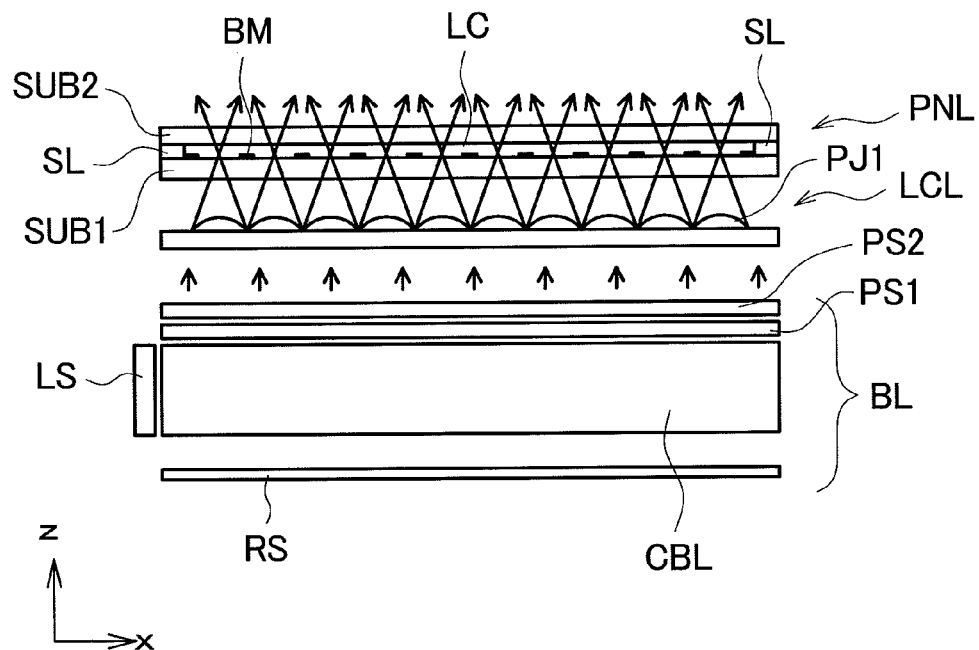
FIG. 1 is a cross-sectional view showing one embodiment of a liquid crystal display device according to the present invention, wherein a cross section taken along a line I-I in FIG. 2 is shown.
Figure 2:
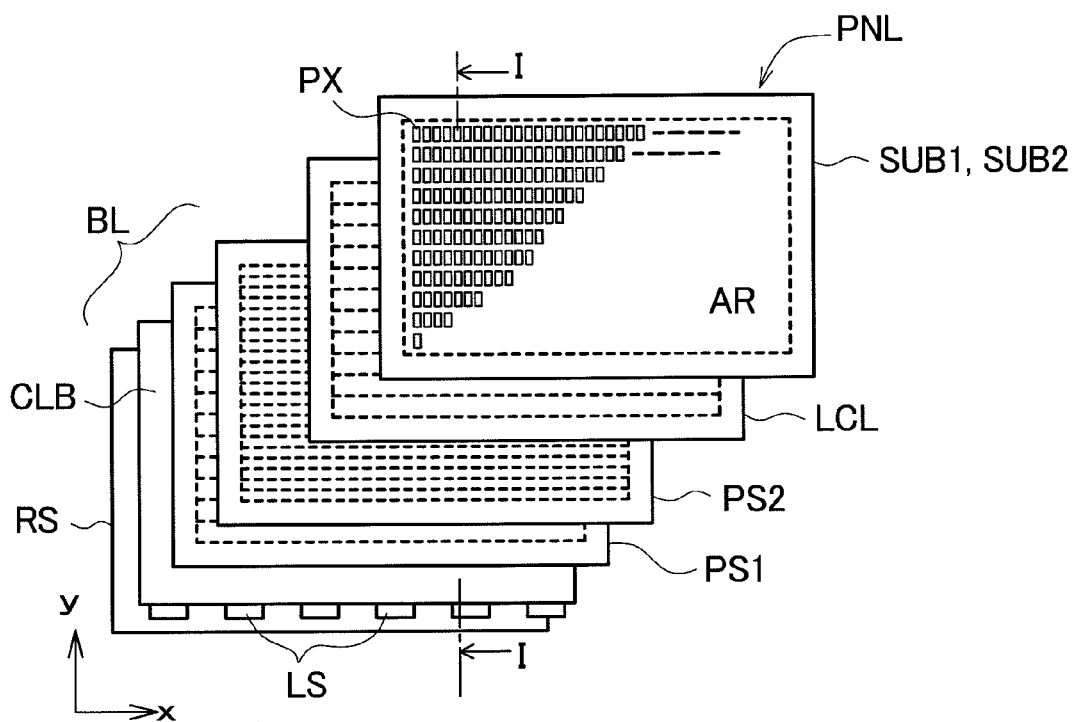
FIG. 2 is an exploded plan view showing one embodiment of the liquid crystal display device according to the present invention.

FIG. 2 is an exploded plan view showing one embodiment of the liquid crystal display device according to the present invention, while FIG. 1 is a view showing a cross section of a portion corresponding to a line I-I in FIG. 2.

The liquid crystal display device arranges, from a viewer side, a liquid crystal display panel PNL, a lenticular lens LCL and a backlight BL in this order. Although the liquid crystal display panel PNL, the lenticular lens LCL and the backlight BL are formed into a module using a plurality of frames not shown in the drawing, the frames are omitted in FIG. 1 and FIG. 2.

The liquid crystal display panel PNL is configured such that a pair of substrates SUB1, SUB2 made of glass, for example, which is arranged parallel to each other forms an envelope, and liquid crystal is sandwiched between the respective substrates SUB1, SUB2.

As shown in FIG. 1, the respective substrates SUB1, SUB2 arrange a sealing material SL on a peripheral side thereof, and the liquid crystal LC is sealed between the substrates SUB1, SUB2 using the sealing material SL.

A pixel circuit or pixel electrodes are formed on a liquid-crystal-side surface of the substrate SUB1. Further, color filters of red, green and blue are formed on a liquid-crystal-side surface of the substrate SUB2. Pixels PX are arranged on the liquid crystal display panel in a matrix array, each pixel PX includes the liquid crystal LC as one constitutional element, and the transmissivity of the liquid crystal LC is configured to be controlled for every pixel PX.

As shown in FIG. 2, the pixels PX are formed in opening portions of a black matrix BM formed on a liquid-crystal-LC-side surface of the substrate SUB1, for example, and allow light from the backlight BL described later to pass therethrough. In FIG. 2, the specific constitution of the pixel is omitted.

Here, assuming a region where the respective pixels PX are formed as a liquid crystal display region AR (region surrounded by a frame indicated by a chained line in the drawing), light from the backlight BL described later is radiated to at least the whole region of the liquid crystal display region AR, and a viewer recognizes an image through the light which passes through the respective pixels PX.

The lenticular lens LCL is configured such that on a liquid-crystal-display-panel-PNL-side surface of a sheet member, projecting portions PJ1 which have a semi-circular cross section and extend in the x direction in the drawing are formed parallel to each other in the y direction in the drawing. The radius of curvature of the projecting portion PJ1 is 164 µm, for example.

Here, a width in the y direction in the drawing of one projecting portion PJ1 extending in the x direction in the drawing (148 µm, for example) is substantially equal to a width of one pixel in the y direction in the drawing, for example. Further, a pitch between one projecting portion PJ1 and the neighboring other projecting portion PJ1 is 153 µm, for example. The width of one projecting portion PJ1 and the pitch between one projecting portion PJ1 and the neighboring other projecting portions PJ1 are set as described above so as to allow light from the backlight BL described later which passes through the respective pixels PX to focus on every pixel PX.

In view of the above, instead of using the lenticular lens LCL, for example, it may be possible to use a so-called micro lens array which is constituted by forming projecting portions having a substantially semispherical cross section on a liquid-crystal-display-panel-PNL-side surface of the sheet member corresponding to the respective pixels. Such a micro lens array can acquire the substantially same advantageous effect.

The backlight BL is constituted of a light guide plate CLB made of a resin material, for example, and having a size substantially equal to a size of the liquid crystal display panel PNL, and a light source LS formed of a plurality of light emitting diodes which faces at least one side wall surface of the light guide plate CLB in an opposed manner and is arranged parallel to each other along the side of the light guide plate CLB.

Further, in the backlight BL of this embodiment, in addition to the light guide plate CLB and the light source LS, between the light guide plate CLB and the liquid crystal display panel PNL, an asymmetrical prism sheet (first asymmetrical prism sheet) PS1 and an asymmetrical prism sheet (second asymmetrical prism sheet) PS2 are arranged in this order from the light-guide-plate-CLB side.

Further, in this embodiment, a reflection sheet RS is arranged on a back surface of the light guide plate CLB. The reflection sheet RS is provided for returning light leaked from a surface (reflection surface) of the light guide plate CLB which faces the reflection sheet RS in an opposed manner to a light-guide-plate-CLB side.

The backlight BL having such a constitution is provided for imparting large light focusing property to light radiated toward the liquid crystal display panel PNL side.

Next, the constitution of the light guide plate CLB, the constitution of the asymmetrical prism sheet PS2, and the constitution of the asymmetrical prism sheet PS1 are respectively described in detail.

Figure 3A:
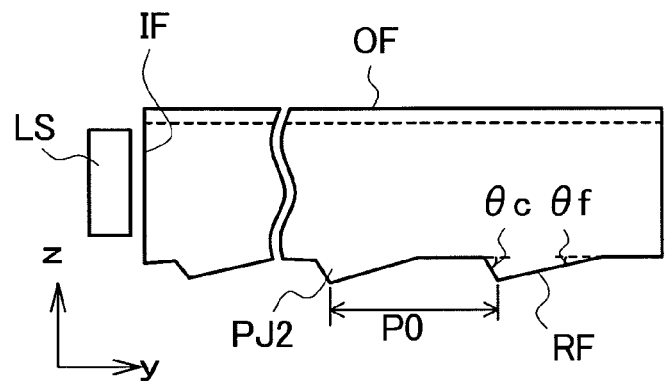
FIG. 3A and FIG. 3B are constitutional views showing one embodiment of a light guide plate of a backlight of the liquid crystal display device according to the present invention.

FIG. 3A is a cross-sectional view showing one embodiment of the light guide plate CLB, wherein the cross-sectional view corresponds to a cross section taken along a line I-I in FIG. 2.

The light guide plate CLB is configured such that a side wall surface of the light guide plate CLB which faces the respective light sources LS arranged parallel to each other in an opposed manner forms a light incident surface IF, a surface of the light guide plate CLB which faces the liquid crystal display panel PNL in an opposed manner forms a light radiation surface OF, and a surface of the light guide plate CLB on a side opposite to the light radiation surface OF forms a reflection surface RF.

Figure 4:
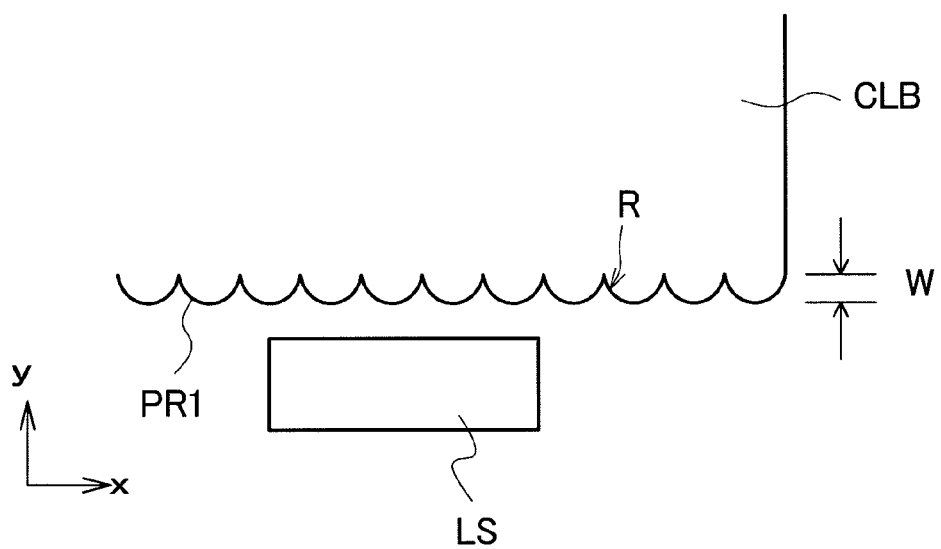
FIG. 4 is a plan view showing one embodiment of the constitution of the light guide plate of the liquid crystal display device according to the present invention which constitutes a side wall surface facing a light source in an opposed manner.

As shown in FIG. 4 which is a plan view as viewed from the light-radiation-surface-OF side, the light incident surface IF of the light guide plate CLB is formed such that projecting surfaces PR1 having an arcuate surface extend in the thickness direction of the light guide plate CLB (z direction in the drawing) and, at the same time, are arranged parallel to each other along the parallel-arranged direction of the light sources LS.

With respect to the projecting surface PR1, the radius of arc R is set to 0.020 mm, for example, and a width W of the projecting surface is set to 0.0027 mm, for example, due to the formation of the projecting surface PR1.

The projecting surfaces PR1 arranged parallel to each other in this manner are formed on the light incident surface IF of the light guide plate CLB so as to allow light from the light source LS to advance in the inside of the light guide plate CLB in a radiating manner. Accordingly, the shape of the projecting surface PR1 in cross section is not limited to the above-mentioned vertical prism shape having a semicircular cross section (lenticular shape), and may be a vertical prism shape having a V-shaped cross section.

Further, as shown in FIG. 3A, on a reflection surface of the light guide plate CLB, projecting portions PJ2 which extend in the x direction in the drawing and are arranged parallel to each other in the y direction (in the depth direction with respect to a surface of a sheet on which FIG. 3A is drawn) in the drawing are formed.

The projecting portion PJ2 has a triangular shape in cross section. Out of inclined surfaces of the projecting portion PR2, the inclined surface of the projecting portion PR2 on a side remote from the light source LS functions as a reflection surface RF which reflects light from the light source LS toward the light radiation surface OF.

Here, out of the respective inclined surfaces of the projecting portion PJ2, an angle $\theta f$ of the inclined surface on a side remote from the light source LS with respect to the light radiation surface OF is set to 1°, for example, while an angle $\theta c$ of the inclined surface on a side close to the light source LS with respect to the light radiation surface OF is set to 79°, for example.

Due to such a constitution, as can be clearly understood from the characteristics shown in FIG. 6 later, it is evident that light radiated from the light radiation surface OF of the light guide plate CLB exhibits brightness having a large peak at a viewing angle of approximately 75°.

In view of the above, it is not always necessary to set the angle $\theta f$ of the inclined surface of the projecting portion PJ2 on a side remote from the light it source LS to 1° with respect to the light radiation surface OF, and the angle $\theta f$ may be set to a value which falls within a range of 2° or less. This is because when the angle $\theta f$ is set to a value which exceeds 2°, light radiated from the light radiation surface OF cannot acquire sufficient brightness.

Here, a pitch between the respective projecting portions PJ2 is set to 0.141 mm, for example.

Figure 3B:
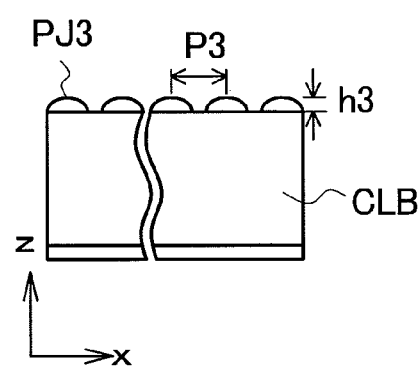

Further, as shown in FIG. 3B, on the light radiation surface of the light guide plate CLB, the projecting portions PJ3 of a prism shape having a semi-circular cross section are formed in a state that the projecting portions PJ3 intersect the projecting portions PJ2. That is, the projecting portions PJ3 extend in the y direction in the drawing (in the depth direction with respect to the surface of a sheet on which FIG. 3B is drawn), and are arranged parallel to each other in the x direction.

The projecting portions PJ3 are formed for focusing light radiated from the light radiation surface OF toward the liquid crystal display panel PNL side. Accordingly, the shape of the projecting portions PJ3 in cross section is not always limited to a prism shape having a semi-circular cross section, and even when the projecting portions PJ3 has prism shape having a V-shaped cross section, for example, it is possible to acquire the substantially same advantageous effect.

Here, a pitch between the respective projecting portions PJ3 is set to 0.0336 mm, for example, and a height h3 of projecting portions PJ3 due to the formation of the projecting portions PJ3 is set to 0.0071 mm, for example.

Figure 5A:
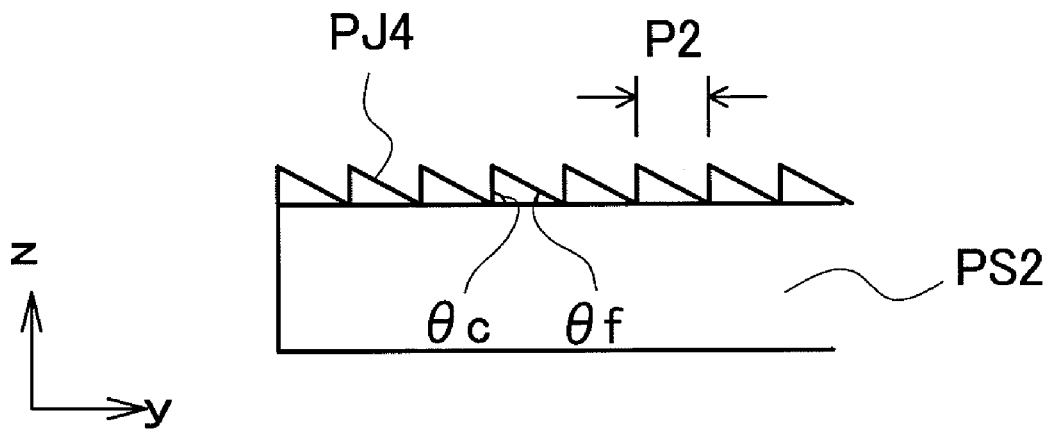
FIG. 5A and FIG. 5B are side views showing an embodiment of an asymmetrical prism sheet provided to the liquid crystal display device according to the present invention.

FIG. 5A is a cross-sectional view showing the constitution of the asymmetrical prism sheet (second asymmetrical prism sheet) PS2, wherein the cross-sectional view corresponds to the cross-sectional view taken along a line I-I in FIG. 2.

In FIG. 5A, on a liquid-crystal-display-panel-PNL-side surface of the asymmetrical prism sheet PS2, projecting portions PJ4 having a triangular shape in cross section are formed. The projecting portions PJ4 extend in the x direction (in the depth direction with respect to a surface of a sheet on which FIG. 5A is drawn), and are arranged parallel to each other in the y direction.

The asymmetrical prism sheet PS2 is literally configured such that an inclination angle $\theta c$ of the triangular projecting portion PJ4 on a side close to the light source LS and an inclination angle $\theta f$ of the triangular projecting portion PJ4 on a side remote from the light source LS are set different from each other, wherein the inclination angle $\theta f$ is set smaller than the inclination angle $\theta c$. For example, the inclination angle $\theta c$ of the triangular projecting portion PJ4 on a side closer to the light source LS is set to 70°, while the inclination angle $\theta f$ of the triangular projecting portion PJ4 on a side remote from the light source LS is set to 42°.

Here, a pitch P2 between the respective neighboring projecting portions is set to 0.033 mm, for example.

Figure 5B:
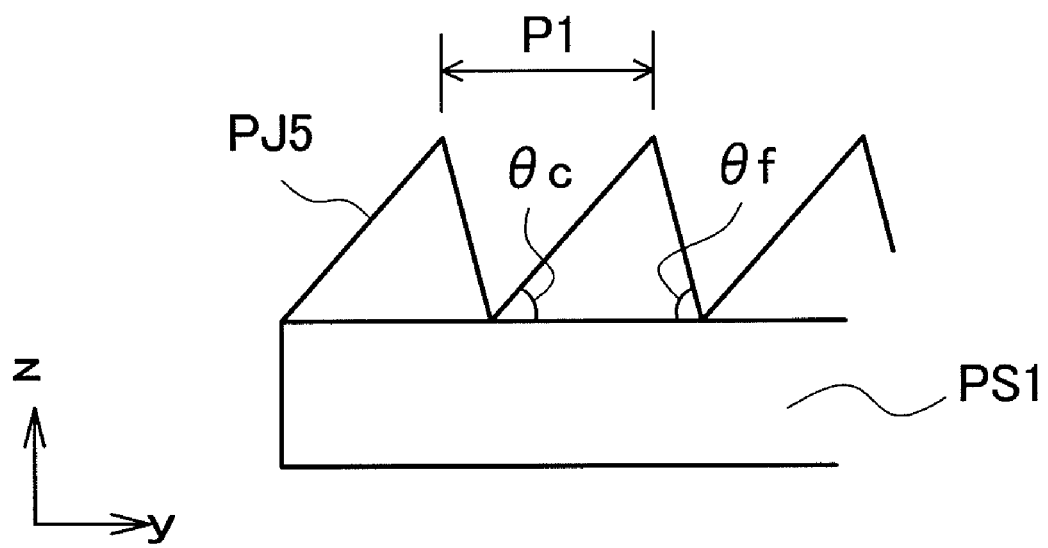

FIG. 5B is a cross-sectional view showing the constitution of the asymmetrical prism sheet (first asymmetrical prism sheet) PS1, wherein the cross-sectional view corresponds to the cross sectional view taken along a line I-I in FIG. 2.

In FIG. 5B, on a liquid-crystal-display-panel-PNL-side surface of the asymmetrical prism sheet PS1, projecting portions PJ5 of a prism shape having a triangular cross section extend in the x direction (in the depth direction with respect to a surface of a sheet on which FIG. 5B is drawn) and are arranged parallel to each other in the y direction.

An inclination angle $\theta c$ of the triangular projecting portion PJ5 on a side closer to the light source LS and an inclination angle $\theta f$ of the triangular projecting portion PJ5 on a side remote from the light source LS are set different from each other, and the inclination angle $\theta f$ is set larger than the inclination angle $\theta c$. With respect to the asymmetrical prism sheet PS1, for example, the inclination angle $\theta c$ of each triangular projecting portion PJ5 on a side close to the light source LS is set to 50°, while the inclination angle θf of each triangular projecting portion PJ5 on a side remote from the light source LS is set to 60°.

A pitch P1 between the respective neighboring projecting portions is set to 0.100 mm, for example.

Further, the angle θc of an inclined surface of the projecting portion PJ5 of the asymmetrical prism sheet PS1 on a light-source-LS side is, as described above, set smaller than the angle θc of an inclined surface of the projecting portion PJ4 of the asymmetrical prism sheet PS2 on the light-source-LS side.

Figure 6:
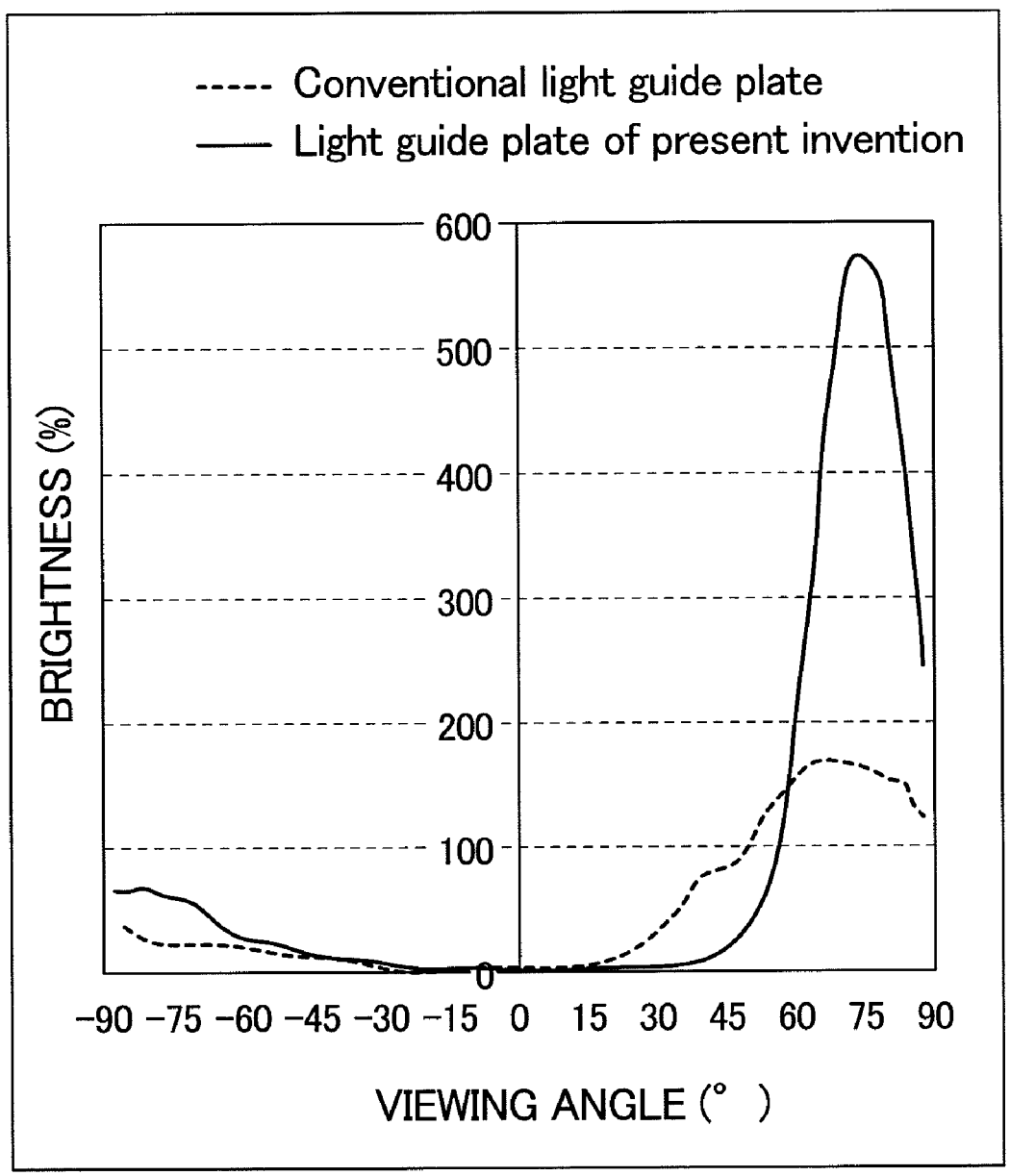
FIG. 6 is a graph showing an advantageous effect of the liquid crystal display device according to the present invention.

FIG. 6 is a graph showing the light radiation characteristic when the inclination angle of the reflection surface RF of the light guide plate CLB is set to 1°, wherein the light radiation characteristic is indicated by a solid line. On the other hand, for a comparison purpose, the light radiation characteristic in a conventional technique in which the inclination angle of the reflection surface is set to a value which falls within a range from 10° to 15° is also shown in FIG. 6, wherein the light radiation characteristic is indicated by a dotted line.

In the graph shown in FIG. 6, a viewing angle (°) of the radiation angle with respect to a normal line of a radiation surface of the light guide plate CLB is taken on an axis of abscissas and the brightness (%) is taken on an axis of ordinates.

As can be understood from the graph, the liquid crystal display device exhibits a characteristic in which the brightness has a large peak at a viewing angle of approximately 75°. The graph shows that it is possible to acquire the light guide plate which possesses excellent light focusing property.

Figure 7:
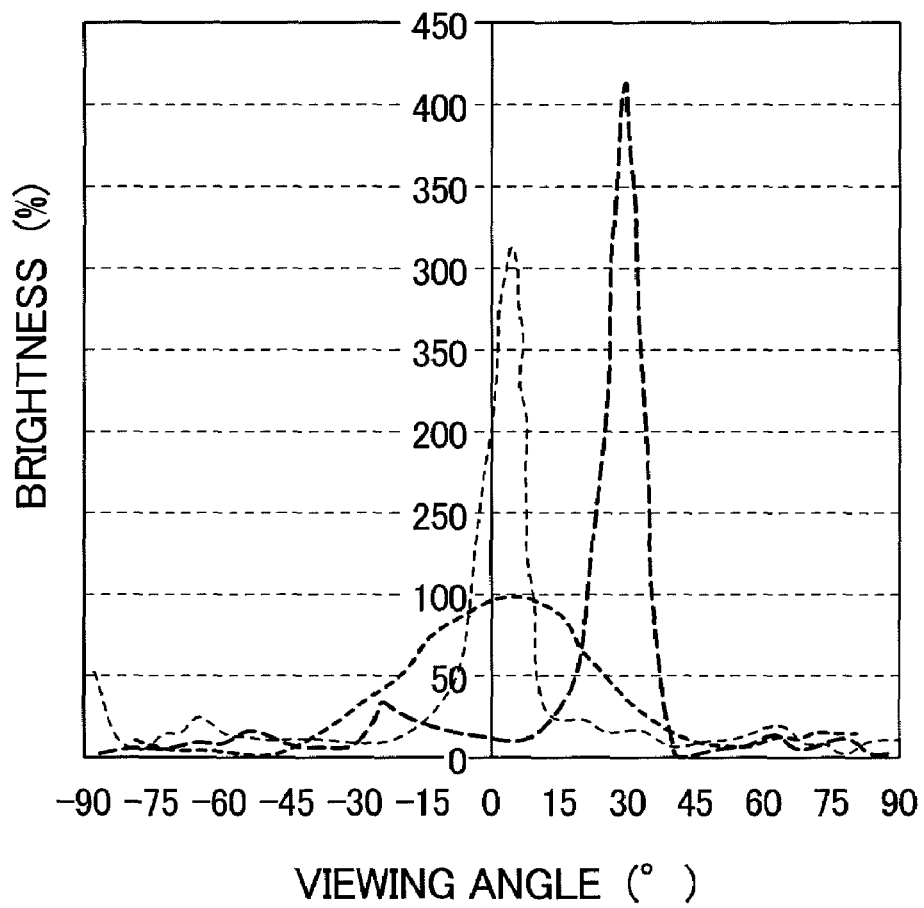
FIG. 7 is a graph showing an advantageous effect of the liquid crystal display device according to the present invention.

Further, FIG. 7 is a graph showing the light radiation characteristic when the asymmetrical prism sheets PS1, PS2 are arranged on a radiation surface side of the light guide plate CLB.

In the same manner as the graph shown in FIG. 6, a viewing angle (°) of the radiation angle with respect to a normal line of a radiation surface of the light guide plate is taken on an axis of abscissas and a brightness (%) is taken on an axis of ordinates.

In the graph shown in FIG. 7, out of the asymmetrical prism sheets PS1 and PS2, first of all, the radiation characteristic when the lower asymmetrical prism sheet PS1 is arranged is indicated by a relatively long dotted line, and the radiation characteristic when the upper asymmetrical prism sheet PS2 is also arranged is indicated by a solid line in the drawing.

As can be clearly understood from the graph, it is confirmed that, by arranging the asymmetrical prism sheet PS1, it is possible to raise an angle of light which is inclined by approximately 75° with respect to a normal direction to approximately 30° and, further, by arranging the asymmetrical prism sheet PS2, it is possible to raise the angle of light such that the direction of the light becomes substantially equal to the normal direction.

Accordingly, the liquid crystal display device can obtain a light guide plate CLB having the characteristic in which the brightness has a large peak as viewed in the front direction (viewing angle of substantially 0°). That is, it is possible to acquire the light guide plate which possesses excellent light focusing property in the normal direction.

Here, also in FIG. 7, the light radiation characteristic in a conventional technique in which the inclination angle of the reflection surface of the light guide plate CLB is set to a value which falls within a range from 10° to 15° is indicated by a dotted line. It is understood from the drawing that the peak of the brightness is shifted toward the normal direction due to the arrangement of the asymmetrical prism sheets PS1, PS2.

The above-mentioned respective embodiments may be used in a single form or in combination. This is because that the advantageous effects of the respective embodiments can be obtained independently or synergistically.

What is claimed is:

1. A liquid crystal display device comprising:
a liquid crystal display panel; and
a backlight which is arranged on a back surface of the liquid crystal display panel, wherein
the backlight includes a light guide plate, a light source arranged on a side wall surface of the light guide plate, and a first asymmetrical prism sheet and a second asymmetrical prism sheet arranged between the light guide plate and the liquid crystal display panel,
a reflection surface having inclination of 2° or less for guiding light emitted from the light source to a liquid-crystal-display-panel side is formed on a back surface of the light guide plate, and
the first asymmetrical prism sheet and the second asymmetrical prism sheet are respectively formed such that each prism sheet includes projecting portions which extend along a direction of a side of the light guide plate on which the light source is arranged, and are arranged parallel to each other in a direction which intersects the direction.

2. A liquid crystal display device according to claim 1, wherein a lenticular lens or a micro lens is arranged between the backlight and the liquid crystal display panel.

3. A liquid crystal display device according to claim 1, wherein the first asymmetrical prism sheet and the second asymmetrical prism sheet differ from each other in shape.

4. A liquid crystal display device according to claim 1, wherein the reflection surface formed on a surface of the light guide plate on a side opposite to the liquid crystal display panel has inclination of 1°.

5. A liquid crystal display device according to claim 1, wherein on the side wall surface on a side of the light guide plate on which the light source is arranged, projecting surfaces which are formed along a thickness direction of the light guide plate are arranged parallel to each other along the side of the light guide plate.

6. A liquid crystal display device according to claim 1, wherein on a surface of the light guide plate which opposes the liquid crystal display panel, projecting portions which extend while intersecting an extending direction of the reflection surface are formed parallel to each other in the extending direction of the reflection surface.

* * * * *